United States Patent [19]

de Brouwer-Elzenbroek et al.

[11] Patent Number: 4,887,444
[45] Date of Patent: Dec. 19, 1989

[54] LOCKING MEANS, AND MORE PARTICULARLY A LOCK FOR A BICYCLE

[75] Inventors: Grada de Brouwer-Elzenbroek; Franciscus J. G. H. de Brouwer; de Brouwer, René E. R., all of Arnhem; Monique Y. M. de Brouwer, Giesbeek, all of Netherlands

[73] Assignee: Karsten Metaal B.V., Veendam, Netherlands

[21] Appl. No.: 223,496

[22] Filed: Jul. 25, 1988

[30] Foreign Application Priority Data

Jul. 24, 1987 [NL] Netherlands .................. 8701751

[51] Int. Cl.⁴ .................................. E05B 71/00
[52] U.S. Cl. ........................... 70/233; 70/34; 70/360; 70/417
[58] Field of Search ............ 70/32, 33, 34, 226, 70/227, 233, 360, 417

[56] References Cited

U.S. PATENT DOCUMENTS

| | | | |
|---|---|---|---|
| 924,331 | 6/1909 | Feola | 70/32 |
| 3,391,555 | 7/1968 | Memo | 70/417 |
| 3,988,910 | 11/1976 | Widen | 70/226 |
| 4,064,716 | 12/1977 | Shwayder | 70/417 |

Primary Examiner—Robert L. Wolfe
Attorney, Agent, or Firm—Edmund M. Jaskiewicz

[57] ABSTRACT

Locking means for preventing or checking use of or access to objects such as, for example, mopeds, bicycles, cars etc. by unauthorized people, said device comprising a bar-type element, comprising a cylinder lock provided with a catch which can be moved at right angles to the axial direction of the cylinder lock by means of, for example, a key, which bar-type element can mate with and is to be placed in two or more holes which are or can be placed in line with each other, the first hole being provided with a groove or keyway which is directed from the inner surface of the hole to the outside, is circular, and the center point of which lines approximately axis of the hole, the latter hole being provided with a bottom, and the internal diameter of each hole corresponding to the external diameter of that part of the bar-type element which is placed in the hole when the bar-type element is in the closed position, and the holes with which the locking means must mate can be provided in one or more objects.

4 Claims, 3 Drawing Sheets

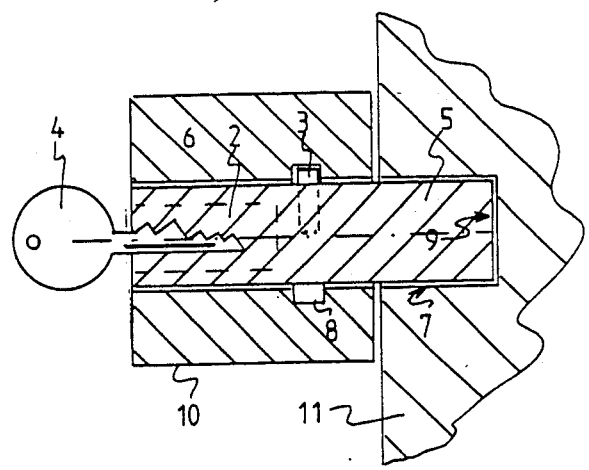
Fig:1
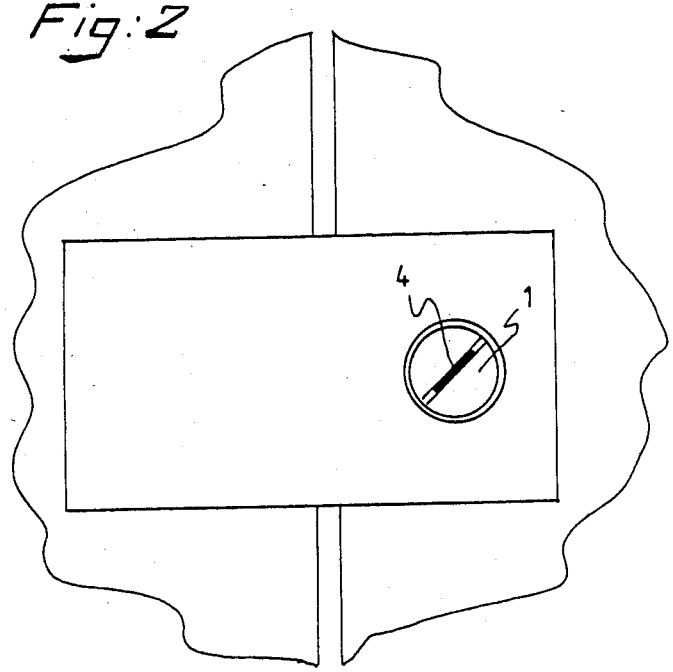
Fig:2

LOCKING MEANS, AND MORE PARTICULARLY A LOCK FOR A BICYCLE

The invention relates to locking means for preventing or checking use of or access to objects such as, for example, mopeds, bicycles, cars etc. by unauthorized people. There are already many known devices which can be used to place objects under lock and key, or to permit locking thereof using locking means.

Unauthorized use of objects such as bicycles, mopeds and the like is a very major problem. All locks known hitherto do not prevent unauthorized parties from breaking the locking means and using such objects, despite the fact that the rightful owner has not given his consent to such use.

The object of the invention is to produce a lock or locking means which makes it very difficult or even impossible for unauthorized persons to use such objects secured by locking means according to the invention.

This object is achieved with locking means according to the invention in that the device comprises a bar-type element, comprising a cylinder lock provided with a catch which can be moved at right angles to the axial direction of the cylinder lock by means of, for example, a key, which bar-type element can mate with and is to be placed in two or more holes which are or can be placed in line with each other, the first hole being provided with a groove or key-way which is directed from the inner surface of the hole to the outside, is circular, and the centre point of which lies approximately on the longitudinal axis of the hole, the latter hole being provided with a bottom, the internal diameter of each hole corresponding to the external diameter of that part of the bar-type element which is placed in the hole when the bar-type element is in the closed position, and the holes are provided in one or more objects with which the locking means must mate.

With such locking means according to the invention it is very easily possible to lock all kinds of objects in such a way that it is very difficult for an unauthorized party to break the lock. Such a lock can withstand a drill, since the lock according to the invention can turn round freely without it being possible to break the lock.

In a preferred embodiment of the locking means according to the invention the bar-type element comprises a bar and a cylinder lock which are attached to each other in such a way that the two longitudinal axes of the bar and the cylinder lock are in line with each other and both the bar and the cylinder lock can turn relative to each other and independently of each other about the longitudinal axis.

With such locking means it is possible to lock objects such as a bicycle or the like in such a way that the chance of a stranger being able to use the bicycle without its owner's consent is extremely small. Such locking means are very difficult to break without using suitable means for that purpose, in most cases a key. If such locking means are tackled with a drill, the bar and the lock will start turning together without any grip thereon being obtained. Sawing through is also very difficult, since the pin will turn round once the saw is placed on the bar.

In a preferred embodiment of the locking means according to the invention which is even more difficult to break, the bar of the bar-type element comprises a sleeve with a central bore holding a bar, and the sleeve thereof is rotatably fixed on the cylinder lock. With such a design of the locking means according to the invention it is made almost impossible to saw through such a lock at the point where the bar-type element of the locking means is located. The sleeve will start to turn if it is not held by pliers; but if it can be held by pliers, the bar inside the sleeve will ensure that the lock cannot be removed any further, for it cannot be held, due to the fact that the sleeve is around it and the bar will thus start to turn without it being possible to obtain a grip on it with a saw.

It is preferable for a bicycle or the like according to the invention to be provided with a U-shaped stirrup, having a hole in each of the legs of the stirrup near the ends, said holes being placed in line with each other, and the last one being provided with a bottom, while the first one is provided with a circular groove. Such a stirrup can be made very sturdy, so that it cannot be broken easily. This means that a bicycle provided with such a stirrup with bar-type element according to the invention is not easy to use by a third party.

In another possible embodiment of the locking means according to the invention the cylinder lock is provided with a projection which fits into the centre bore of the sleeve of the bar, and the cyclinder lock and the bar-type element are connected to each other by means of grooves and a retaining spring. This is a very good way of connecting the cylinder lock and the bar-type part of the bar-type element to each other. With such a connection of the bar-type element and the cylinder lock it is not possible to break the connection between the cylinder lock and the bar from the outside.

Of course, the part of the lock, namely the bar-type element, must be stowed somewhere when it is not in use. For this purpose the stirrup is preferably provided with a central bore containing a groove directed from the inner surface to the outside, in which bore the bar-type element can be stowed and locked.

In another possible embodiment of the locking means according to the invention the holes in the stirrup are placed so far apart that sufficient space is left between the two legs for two links of a chain or for another element, provided with a hole or bore with a diameter corresponding to the external diameter of the bar-type element, to be placed between them. This makes it possible also to fix to the lock means such as a chain for fastening the bicycle also to a post, and these means can be locked at the same time as the locking means according to the invention.

The invention will be explained in greater detail with reference to the drawing, in which:

FIG. 1 shows a cross section of a possible embodiment of locking means according to the invention;

FIG. 2 shows a front view of locking means of the type shown in FIG. 1;

Figure 3:
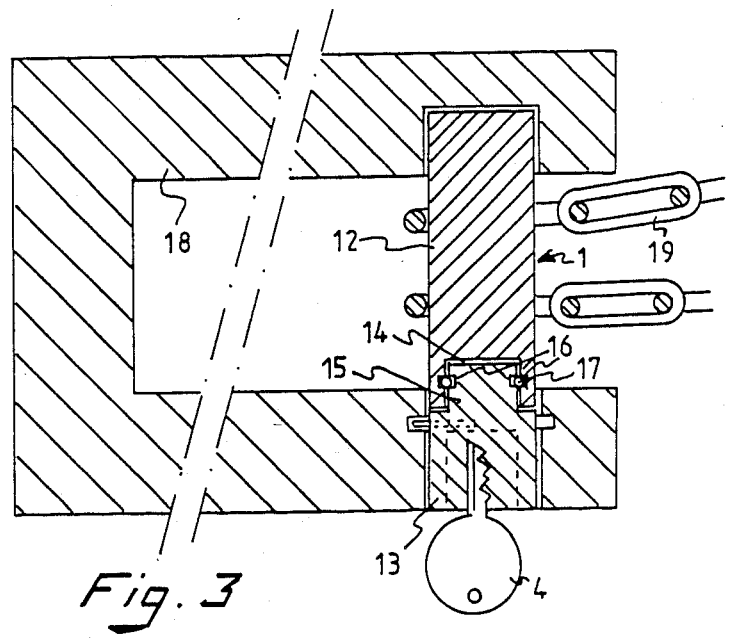
FIG. 3 shows another possible embodiment of locking means according to the invention.

FIGS. 1 and 2 show a possible embodiment of locking means according to the invention. The locking means comprise a bar-type element 1, comprising a cylinder lock 2 which is provided with a catch 3. Using, for example, a key 4, the catch 3 can be moved at right angles to the axial direction 5 of the cylinder lock 2. The bar-type element 1 can mate with and is here moved into two holes 6, 7 which are situated or placed in line with each other. The first hole 6 is provided with a groove or keyway 8 which runs from the internal surface 7 of the hole 6 to the outside, and which is circular. The centre point is approximately on the longitudnal axis 5 of the hole 6. The last hole 7, in this case also the second hole, is provided with a bottom 9. The internal diameter of the two holes 6, 7 corresponds to the external diameter of the bar-type element 1 which is placed in the holes 6, 7. When the bar-type element 1 is in the locked position and is thus placed in the holes with which the locking means must mate, several objects can be connected to each other by means of the bar-type element 1, namely through the fact that the holes 6, 7 are in two different objects 10, 11, for example two doors which can be pushed towards each other. With such locking means it is possible to turn the bar-type element 1 when the lock is locked through the catch 3 being turned outwards by means of the key 4. FIG. 2 shows in front view the locking means shown in FIG. 1.

FIG. 3 shows another possible embodiment of the locking means according to the invention. In this embodiment of the locking means the bar-type element 1 comprises a bar 12 and a cylinder lock 13 which are fixed to each other in such a way that the two longitudinal axes of the bar 12 and the cylinder lock 13 coincide. The bar 12 is provided with a bore 14 into which a projection 15 of the cylinder lock 13 fits. The projection 15 and the bore 14 are provided with keyways 16, by means of which the cylinder lock 13 and the bar are connected to each other with the aid of a sprung ring 17 so that they rotate about the longitudinal axis. In this way both the bar 12 and the cylinder lock 13 can turn about the longitudinal axis relative to each other and independently of each other. This makes it very difficult to break the lock at the point where the bar-type element 1 is located. Drilling it out does not work, because the lock will start to turn with the drill, so that the drill will not gain any grip on the lock. It will also be very difficult to saw through the lock, since the bar has to be held in place with another tool if this is to succeed. This lock is designed as a stirrup lock 18 which could be mounted on, for example, a bicycle. It is also possible to use the bar-type element for fastening the two ends of a chain 19 to it, so that a bicycle can be fastened to, say, a post.

Figure 4:
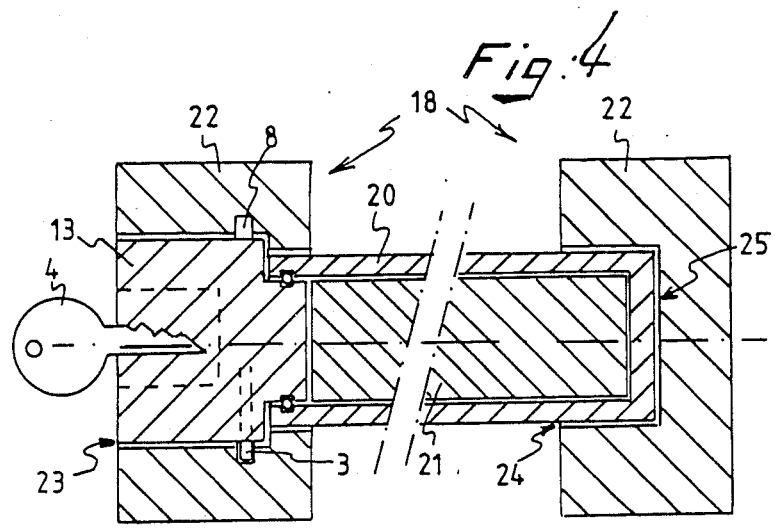
FIG. 4 shows yet another possible embodiment of locking means according to the invention.

FIG. 4 shows yet another possible embodiment of the locking means according to the invention. This figure shows in cross section a lock 14 for a bicycle which can be designed just like the stirrup lock shown in FIG. 3. Such a stirrup lock can then be mounted with a pair of bolts on the bicycle, preferably near the carrier. In this embodiment of the locking means the bar of the bar-type element 1 comprises a sleeve 20 with a central bore accommodating a preferably hardened metal bar 21. The sleeve 20 is rotatably fastened to the cylinder lock 13 in the same way as shown in FIG. 3. The two legs 22 of the stirrup 18 are provided with holes 23, 24 lying in line with each other. One hole is provided with a bottom 25, against which the bar-type element 1 comes to rest when it is in the closed position. The first hole is provided with a keyway 8 into which the catch 3 of the cylinder lock 13 falls. As soon as an attempt is made to saw through this lock at the bar-type element 1 with a saw and, for example, using pliers to hold the sleeve 20, it will not be possible to grip the bar 21 which is in the sleeve 20, so that the saw will not be able to gain any grip on it.

Figure 5:
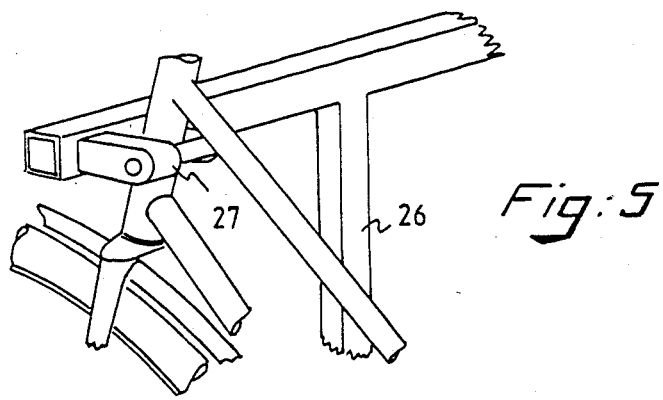
FIG. 5 shows a possible embodiment of the locking means according to the invention used to lock a bicycle.
Figure 6:
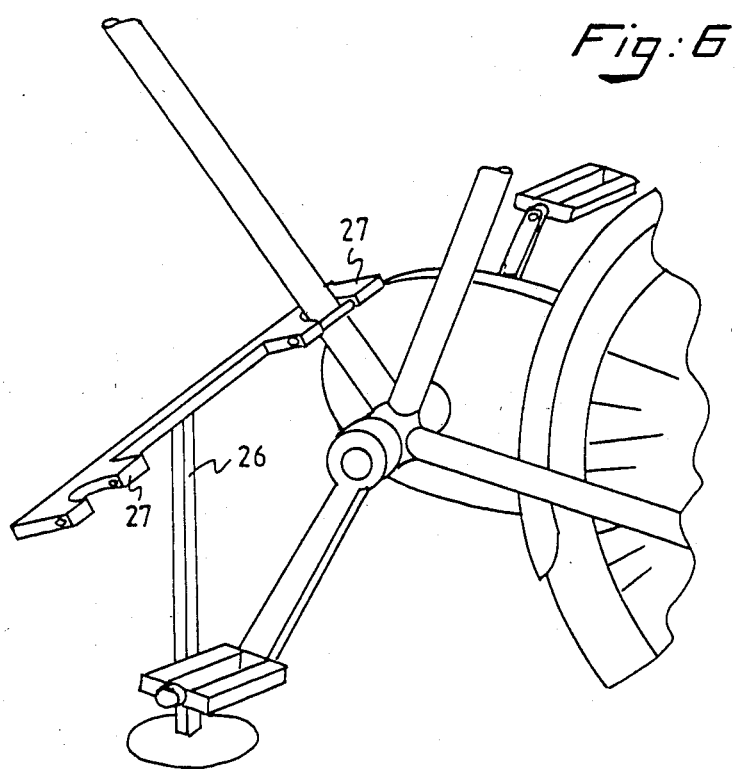
FIG. 6 shows another possible embodiment for using the locking means according to the invention to lock a bicycle.

The use of a bar-type element is not limited to locks such as those shown in the above figures. The same bar-type element as that used in a lock of the type shown can be used in a lock of the type shown in FIGS. 5 and 6. These locks comprise a frame 26 anchored in the ground. The frame 26 has U-shaped or stirrup-type elements 27 which are, for example, designed in the way described in FIGS. 3 and 4. This means that it is possible with such a bar-type element of a bicycle lock of the type shown in FIGS. 3 and 4, fitted on a bicycle, to fasten the bicycle to such a frame; for this the bar-type element must be removed from the bicycle lock and then placed in the stirrup-type lock of the frame 26 or bicycle rack and locked.

We claim:

1. A locking device particularly for vehicles comprising a pair of members each having a bore therein and said bores being aligned, one of said bores having an annular groove therein, a cylinder lock having a catch movable at right angles to the longitudinal axis of said cylinder lock and said catch being receivable in said annular groove such that said cylinder lock is rotatable in said one bore, a locking bar element rotatably mounted on said cylinder lock such that the longitudinal axes of said cylinder lock and said locking bar element are aligned and both said cylinder lock and said locking bar element are rotatable relative to each other and independently of each other around the aligned longitudinal axes, said locking bar element having an end thereof received in the other of said bores.

2. A locking device as claimed in claim 1 wherein said cylinder lock has an axial projection extending toward the other of said bores, said locking bar element being rotatably mounted on said axial projection.

3. A locking device as claimed in claim 1 wherein said cylinder lock has an axial projection extending toward the other of said bores, said locking bar element comprising a sleeve rotatably mounted on said axial projection of said cylinder lock, and a freely rotatable bar within said rotatable sleeve and rotatable around said aligned longitudinal axes.

4. A locking device as claimed in claim 1 wherein said pair of members comprises a pair of legs of a U-shaped element.

* * * * *